Feb. 19, 1946.     D. V. SARBACH     2,395,071
METHOD OF ADHERING RUBBERY MATERIALS TO EACH OTHER AND PRODUCT THEREOF
Filed June 10, 1943

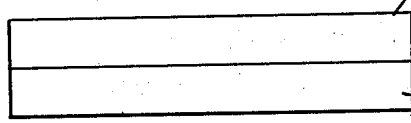

Fig-1

Butadiene acrylonitrile copolymer composition containing chlorinated alkyl carbonate.

Natural rubber composition containing chlorinated alkyl carbonate.

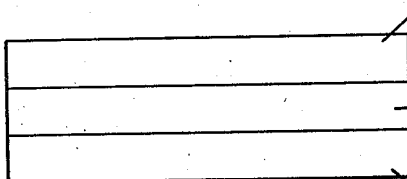

Fig-2

Butadiene acrylonitrile copolymer composition.

Neoprene composition containing chlorinated alkyl carbonate.

Natural rubber composition.

Inventor
Donald V. Sarbach
By Harold S. Meyer
Atty.

Patented Feb. 19, 1946

2,395,071

UNITED STATES PATENT OFFICE 2,395,071

METHOD OF ADHERING RUBBERY MATERIALS TO EACH OTHER AND PRODUCT THEREOF

Donald V. Sarbach, Cuyahoga Falls, Ohio, assignor to The B. F. Goodrich Company, New York, N. Y., a corporation of New York Application June 10, 1943, Serial No. 490,332

20 Claims. (Cl. 154—2)

This invention relates to a method of adhering vulcanizable rubbery materials to each other and to the composite products thereby obtained. More particularly, the invention relates to the adhesion of synthetic rubber of the type which is prepared by the copolymerization of a butadiene-1,3 hydrocarbon and an acrylic nitrile, to other rubbery materials such as natural rubber and other synthetic rubbers.

It is known that synthetic rubber of the type prepared by the copolymerization of a butadiene-1,3 hydrocarbon such as butadiene-1,3, isoprene, 2,3-dimethyl butadiene-1,3, piperylene or the like with an acrylic nitrile such as acrylonitrile, methacrylonitrile, ethacrylonitrile, alpha-chloro acrylonitrile or the like, is inherently deficient in adhesive properties and as a result thereof it has heretofore been extremely difficult to fabricate articles wherein such synthetic rubber is tightly adhered to other rubbery materials. This type of synthetic rubber, however, is particularly valuable because of its excellent oil resistance and abrasion resistance and consequently many applications constantly arise wherein it would be desirable to adhere this type of synthetic rubber to some other rubbery material.

I have now discovered that rubbery copolymers of butadiene-1,3 hydrocarbons and acrylic nitriles may be tightly adhered to other rubbery materials during the vulcanization of structures containing an unvulcanized composition comprising the copolymer in adhering relation to an unvulcanized composition comprising the other rubbery material if there is incorporated in at least one of the unvulcanized compositions a chlorine containing ester of a carbonic acid and a monohydric alcohol. Still better adhesions are obtained if such an ester is included in each of the compositions to be adhered to each other or if instead of directly adhering the two rubbery compositions to each other there is interposed between the two an intermediate bonding means comprising an unvulcanized composition containing a rubbery material and such a chlorine containing ester. Other preferred methods of obtaining excellent adhesions between butadiene acrylic nitrile copolymers and various other rubbery materials by the use of such esters in the adhesive layer will be hereinafter described.

The chlorine containing ester employed may be any ester of a carbonic acid (that is, an acid containing a single carbon atom attached by all four of its valences to negative groups at least one of which is an —OH group) including metacarbonic acid,

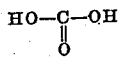

(commonly called carbonic acid and hereinafter designated as carbonic acid) ortho-carbonic acid, C—(OH)₄, and chloro carbonic acid,

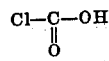

with any monohydric alcohol such as aliphatic, aromatic, cycloaliphatic or heterocyclic alcohols, provided, of course, that the ester contains at least one chlorine atom in either the acid or alcohol residue. Typical examples of such chlorine containing esters include the chlorinated-alkyl esters of carbonic acid wherein the chlorinated-alkyl radical replaces either one or both of the hydrogens of the acid such as mono alpha-chloroethyl carbonate, mono alpha-chloro butyl carbonate, ethyl alpha-chloro ethyl carbonate, ethyl alpha-beta-dichloroethyl carbonate, bis-(alpha-beta-beta-beta-tetrachloroethyl) carbonate, di-(alpha-chlorobutyl) carbonate, di-(alpha-beta-dichlorobutyl) carbonate, di-(alpha-chlorooctyl) carbonate, di-(alpha-chloroisoamyl) carbonate, chlorinated octyl butyl carbonates and the like; the chlorinated alkyl esters of orthocarbonic acid such as the chlorinated ethyl or butyl orthocarbonates and the alkyl or chlorinated alkyl esters of chlorocarbonic acid such as the methyl, ethyl, propyl, isoamyl, butyl and octyl esters of chlorocarbonic acid, alpha-beta dichloroethyl chlorocarbonate, chlorobutyl chlorocarbonate and the like. Other esters of the general structure

wherein at least one of X and Y contains at least one chlorine atom, X is Cl, OH or O—Y and Y is a hydrocarbon or chlorinated hydrocarbon radical, may also be employed.

All of the above-described chlorine-containing esters are well known to the art and may be prepared by methods known to the art. The chlorinated alkyl carbonates may be prepared, for example, by reacting the corresponding alkyl carbonates with chlorine in the manner customarily used for chlorinated organic compounds. The esters of chloro-carbonic acid may be prepared by reacting the appropriate monohydric alcohol with phosgene.

The preferred chlorine containing esters for use in this invention are the chlorinated alkyl carbonates which contain at least 10% by weight of chlorine and preferably from 20 to 80% by weight of chlorine. Esters of this type which possess boiling points greater than about 175° C. such as the chlorinated alkyl carbonates containing from 6 to 18 carbon atoms are particularly preferred. Chlorinated di-butyl, di-octyl, di-isoamyl, di-hexyl, octyl butyl and similar carbonates containing 20 to 80% by weight of chlorine are especially useful materials in this class.

As mentioned above such chlorine containing esters are employed according to this invention in the adhesion during vulcanization of rubbery copolymers of butadiene-1,3 hydrocarbons and acrylic nitriles to other vulcanizable rubbery materials. Although any vulcanizable rubbery copolymer of a butadiene-1,3 hydrocarbon and an acrylic nitrile may be employed, the most commonly used synthetic rubbers of this type are the rubbery copolymers of butadiene-1,3 and acrylonitrile which are prepared by the copolymerization in aqueous emulsion of a mixture of butadiene-1,3 and an equal or lesser amount of acrylonitrile. Such synthetic rubbers are known commercially under such trade names as "Perbunan," "Perbunan Extra," "Hycar O. R.," etc.

The other rubbery material to which the butadiene-1,3 acrylic nitrile copolymer is adhered may be any of a number of rubbery materials which are vulcanizable, i. e., are capable of being converted from an essentially plastic to an essentially elastic state by the action of vulcanizing agents and/or heat. Thus, any of the various naturally occurring vulcanizable rubbery materials such as the various grades of caoutchouc (hereinafter referred to specifically as natural rubber), balata, gutta percha, guayule and like gums may be employed. Vulcanizable synthetic rubbers such as the polymers of butadienes-1,3 including butadiene-1,3, isoprene, 2-3-dimethyl butadiene-1,3 and other butadiene-1,3 hydrocarbons as well as substituted butadienes-1,3 such as 2-chloro butadiene-1,3 (chloroprene) 2-bromo butadiene-1,3, 2-methoxy butadiene, 2-cyano butadiene-1,3, etc.; and the rubbery copolymers of such butadienes-1,3 with one another or with other unsaturated compounds such as styrene, vinyl naphthalene, camphene, isobutylene and other unsaturated hydrocarbons, acrylic acid and its esters and amides, vinyl ethers, vinyl ketones, vinyl carbinols, vinylidene chloride and various other unsaturated acids, esters, ethers, alcohols, amides, etc., may also be used. Still other vulcanizable rubbery materials such as reclaimed natural or synthetic rubber, polyalkylene polysulfides, etc., may also be used. The commercially available rubbery materials ordinarily employed in the practice of the invention include in addition to natural rubber and reclaimed natural rubber, the rubbery polymers of chloroprene known commercially as "neoprene," the rubbery copolymers of butadiene-1,3 and styrene known as "Buna-S" and "GR-S" and the rubbery copolymers of butadiene-1,3 and isobutylene known commercially as "Butyl" and "Flexon."

In the practice of the invention according to one embodiment, illustrated in Fig. 1 of the accompanying drawing, a butadiene-1,3 acrylonitrile copolymer is adhered to natural rubber in the following manner:

An unvulcanized composition comprising a butadiene-1,3 acrylonitrile copolymer is prepared by mixing the following ingredients on a two roll mixing mill.

| | Parts by weight |
|---|---|
| Butadiene-1,3 acrylonitrile copolymer prepared by the emulsion copolymerization of 55 parts of butadiene-1,3 and 45 parts of acrylonitrile | 100.00 |
| Channel black | 50.00 |
| Zinc oxide | 5.0 |
| Soft coal tar | 20.0 |
| Phenyl-beta-naphthylamine | 1.5 |
| Lauric acid | 1.5 |
| Benzo thiazyl disulphide | 2.0 |
| Sulphur | 2.0 |

Another unvulcanized composition, this one comprising natural rubber, is prepared by mixing the following ingredients:

| | Parts by weight |
|---|---|
| Natural rubber (masticated pale cope) | 100.00 |
| Channel black | 50.00 |
| Zinc oxide | 5.0 |
| Soft coal tar | 5.0 |
| Phenyl-beta-naphthylamine | 1.5 |
| Lauric acid | 1.8 |
| Benzo thiazyl disulphide | 0.8 |
| Sulphur | 3.5 |

Each of these compositions is then mixed with a chlorinated dibutyl carbonate containing approximately 45% by weight of chlorine, 40 parts by weight of the chlorinated ester being admixed with the butadiene-1,3 acrylonitrile copolymer composition and 10 parts by weight with the natural rubber composition. The two compositions are then separately sheeted out on a mill, their surfaces are brushed with a volatile organic solvent such as benzene or ethylene dichloride, and they are then brought into intimate contact and vulcanized together in a press for 45 minutes at 300° F. In the composite vulcanized product thus obtained, the butadiene-1,3 acrylonitrile copolymer composition is so tightly adhered to the natural rubber composition that the two stocks cannot be pulled apart without tearing the rubber layer. When adhesion of the two compounds is attempted in the same manner without mixing them with the chlorinated dibutyl carbonate, little if any adhesion is obtained. When only one of the two compositions is mixed with the chlorinated ester, however, greatly improved adhesion is secured. When the natural rubber composition of the above-embodiment is substituted by a butadiene-1,3 styrene copolymer synthetic rubber, by a neoprene type synthetic rubber or by other vulcanizable rubbery materials other excellent adhesions are obtained. The chlorinated dibutyl carbonate used may also be replaced with other chlorinated esters of the type described hereinabove, and excellent adhesions thus obtained.

Instead of directly adhering the butadiene-1,3 acrylonitrile copolymer to the other rubbery material as in the above embodiment, it is often desirable to employ an intermediate bonding means comprising a rubbery material containing a chlorinated ester between the two compositions and thereby obtain even better adhesion in the final product. Such a bonding means may take the form of a single cement or a plurality of step off cements, or a single tie ply or a plurality of tie plies. The following structures illustrate preferred examples of this method of practicing the invention, the vertical lines indicating interfaces between unlike compositions and the various compositions used being compounded in a manner similar to the compositions of the embodiment described hereinabove:

scribed in my copending application Serial No. 490,331, filed June 10, 1943, larger amounts may be used.

The compounding of the several compositions used in the adhesions described may be varied widely in accordance with the methods well known to the art. Any of the various pigments, fillers, softeners, antioxidants, vulcanizing agents

| | | |
|---|---|---|
| Butadiene-1,3 acrylonitrile copolymer composition. | Composition comprising Butadiene-1,3 acrylonitrile copolymer+natural rubber+a chlorinated dialkyl carbonate. | Natural rubber composition. |
| Butadiene-1,3 acrylonitrile copolymer composition+chlorinated dibutyl carbonate. | Composition comprising butadiene-1,3 acrylonitrile copolymer+natural rubber+chlorinated dibutyl carbonate. | Natural rubber composition+chlorinated dibutyl carbonate. |
| Butadiene-1,3 acrylonitrile copolymer composition. | Composition comprising butadiene-1,3 acrylonitrile copolymer, butadiene-1,3 styrene copolymer+a chlorinated alkyl carbonate. | Natural rubber composition. |
| Do | Butadiene-1,3 methyl methacrylate copolymer+a chlorinated alkyl carbonate. | Do. |
| Do | Butadiene-1,3 styrene copolymer+a chlorinated alkyl carbonate. | Butadiene-1,3 styrene copolymer composition. |
| Do | Composition comprising neoprene+a chlorinated dialkyl carbonate. | Natural rubber composition. |
| Do | do | Butadiene-1,3 styrene copolymer composition. |
| Do | Composition comprising neoprene, butadiene-1,3 acrylonitrile copolymer+chlorinated dialkyl carbonate. | Natural rubber composition. |

The last two of the above structures wherein neoprene (polymerized chloroprene) is employed in the bonding layer have been found to give especially valuable results. As a further example of this preferred procedure illustrated in Fig. 2 of the accompanying drawing, a neoprene composition containing the following ingredients is prepared:

| | Parts by weight |
|---|---|
| Neoprene G (a plastic polymerized chloroprene) | 100.0 |
| Channel black | 35.0 |
| Zinc oxide | 5.0 |
| Light magnesium oxide | 4.0 |
| Lauric acid | 2.0 |
| Di-chlorobutyl carbonate | 5.0 |

This composition is then interposed between a butadiene-1,3 acrylonitrile copolymer composition and a natural rubber composition and the plied up structure is vulcanized. Very excellent adhesion is thus obtained. If the above neoprene composition is made up in a cement and the surface of a butadiene-1,3 acrylonitrile copolymer and of natural rubber are brushed therewith and then these two materials are brought into contact and vulcanized, excellent adhesion between the natural rubber and the butadiene-1,3 acrylonitrile copolymer is obtained. Similar excellent adhesions are also secured if up to 50% by weight of the neoprene in the above composition is replaced by a butadiene-1,3 acrylonitrile copolymer.

The proportions of the chlorinated alkyl carbonate employed in the above-described compositions may be varied widely depending upon the particular rubbery materials adhered to each other and the properties desired in the finished composite product. In general, however, the use of from 5 to 50 parts of the ester per 100 parts of rubbery material in the compositions comprising the ester is to be preferred. If the sole purpose of employing the ester is to improve adhesion this may be accomplished by as little as 5 parts or even less of the ester per 100 parts of rubbery material and it is generally unnecessary to use over 25 parts. If it is desired to take advantage of the additional effects such as the softening properties imparted by these chlorinated esters, which effects are more fully described in my copending application Serial No. 490,331, filed June 10, 1943, larger amounts may be used.

and vulcanization accelerators may be incorporated therein. It is preferred, however, to compound the various compositions used in any one adhesion in substantially the same manner so that the softeners in any one composition used will be miscible in each of the other compositions and so that each of the compositions will have substantially the same rate of cure.

Many other variations and modifications of the invention will be apparent to those skilled in the art and are within the spirit and scope of the invention as defined in the appended claims.

I claim:

1. The method of adhering a vulcanizable rubbery copolymer of a butadiene-1,3 hydrocarbon and an acrylic nitrile to another vulcanizable rubbery material which comprises placing in adhering relation an unvulcanized composition comprising said copolymer and an unvulcanized composition comprising said other rubbery material, at least one of which compositions also comprises a chlorine containing ester of carbonic acid with a monohydric alcohol, and then vulcanizing the assembly.

2. The method of adhering a vulcanizable rubbery copolymer of butadiene-1,3 and acrylonitrile to natural rubber which comprises placing in adhering relation an unvulcanized composition comprising said rubbery copolymer and a chlorinated alkyl carbonate, and an unvulcanized composition comprising natural rubber and a chlorinated alkyl carbonate, and then vulcanizing the assembly.

3. The method of adhering a vulcanizable rubbery copolymer of butadiene-1,3 and acrylonitrile to another vulcanizable rubbery material which comprises interposing between an unvulcanized composition comprising said rubbery copolymer and an unvulcanized composition comprising said other rubbery material an intermediate bonding means, said bonding means comprising an unvulcanized composition comprising a vulcanizable rubbery material and a chlorinated dialkyl carbonate containing at least 10% by weight of chlorine, and then vulcanizing the assembly.

4. The method of adhering a vulcanizable rubbery copolymer of butadiene-1,3 and acrylonitrile to natural rubber which comprises interposing between an unvulcanized butadiene-1,3 acrylonitrile copolymer composition and an unvulcanized natural rubber composition an intermediate bonding means said bonding means comprising an unvulcanized composition comprising a butadiene-1,3 acrylonitrile copolymer, natural rubber and a chlorinated dialkyl carbonate containing at least 10% by weight of chlorine, and then vulcanizing the assembly.

5. The method of adhering a vulcanizable rubbery copolymer of butadiene-1,3 and acrylonitrile to natural rubber which comprises interposing between an unvulcanized butadiene-1,3 acrylonitrile copolymer composition and a natural rubber composition an intermediate bonding means, said bonding means including a plurality of layers of unvulcanized rubbery compositions each of which contains a chlorinated alkyl carbonate containing at least 10% by weight of chlorine, the layer adjacent the butadiene-1,3 acrylonitrile copolymer composition also containing a butadiene-1,3 acrylonitrile copolymer and the layer adjacent the natural rubber composition also containing natural rubber, and then vulcanizing the assembly.

6. The method of adhering a vulcanizable rubbery copolymer of butadiene-1,3 and acrylonitrile to a vulcanizable rubbery copolymer of butadiene-1,3 and styrene which comprises interposing between an unvulcanized butadiene-1,3 acrylonitrile copolymer composition and an unvulcanized butadiene-1,3 styrene copolymer composition an interposed bonding means, said bonding means comprising an unvulcanized composition comprising a butadiene-1,3 acrylonitrile copolymer, a butadiene-1,3 styrene copolymer and a chlorinated dialkyl carbonate containing at least 10% by weight of chlorine, and then vulcanizing the assembly.

7. The method of adhering a vulcanizable rubbery copolymer of butadiene-1,3 and acrylonitrile to another vulcanizable rubbery material which comprises interposing between an unvulcanized composition comprising said rubbery copolymer and an unvulcanized composition comprising said other rubbery material an intermediate bonding means said bonding means comprising an unvulcanized composition comprising a plastic polymerized chloroprene and a chlorinated alkyl carbonate, and then vulcanizing the assembly.

8. The method of adhering a vulcanizable rubbery copolymer of butadiene-1,3 and acrylonitrile to natural rubber which comprises interposing between an unvulcanized butadiene-1,3 acrylonitrile copolymer composition and a natural rubber composition an intermediate bonding means said bonding means comprising an unvulcanized composition comprising a plastic polymerized chloroprene and a chlorinated dialkyl carbonate containing at least 10% by weight of chlorine, and then vulcanizing the assembly.

9. The method of adhering a vulcanizable rubbery copolymer of butadiene-1,3 and acrylonitrile to natural rubber which comprises interposing between an unvulcanized butadiene-1,3 acrylonitrile copolymer composition and a natural rubber composition an interposed bonding means said bonding means comprising an unvulcanized composition comprising a plastic polymerized chloroprene, a lesser amount of a butadiene-1,3 acrylonitrile copolymer and a chlorinated dialkyl carbonate containing at least 10% by weight of chlorine, and then vulcanizing the assembly.

10. The method of adhering a vulcanizable rubbery copolymer of butadiene-1,3 and acrylonitrile to another vulcanizable rubbery material which comprises interposing between an unvulcanized composition comprising said rubbery copolymer and an unvulcanized composition comprising said other rubbery material an intermediate bonding means, said bonding means comprising a plastic polymerized chloroprene and a chlorinated dibutyl carbonate containing from 20 to 80% by weight of chlorine, and then vulcanizing the assembly.

11. A composite product comprising a vulcanized rubbery copolymer of a butadiene-1,3 hydrocarbon and an acrylic nitrile adhered to another vulcanized rubbery material, said product having been prepared by the method of claim 1.

12. A composite product comprising a vulcanized rubbery copolymer of butadiene-1,3 and acrylonitrile adhered to vulcanized natural rubber, said product having been prepared by the method of claim 2.

13. A composite product comprising a vulcanized rubbery copolymer of butadiene-1,3 and acrylonitrile adhered to another vulcanized rubbery material, said product having been prepared by the method of claim 3.

14. A composite product comprising a vulcanized rubbery copolymer of butadiene-1,3 and acrylonitrile adhered to vulcanized natural rubber, said product having been prepared by the method of claim 4.

15. A composite product comprising a vulcanized rubbery copolymer of butadiene-1,3 and acrylonitrile adhered to vulcanized natural rubber, said product having been prepared by the method of claim 5.

16. A composite product comprising a vulcanized rubbery copolymer of butadiene-1,3 and acrylonitrile adhered to a vulcanized rubbery copolymer of butadiene-1,3 and styrene, said product having been prepared by the method of claim 6.

17. A composite product comprising a vulcanized rubbery copolymer of butadiene-1,3 and acrylonitrile adhered to another vulcanized rubbery material, said product having been prepared by the method of claim 7.

18. A composite product comprising a vulcanized rubbery copolymer of butadiene-1,3 and acrylonitrile adhered to vulcanized natural rubber, said product having been prepared by the method of claim 8.

19. A composite product comprising a vulcanized rubbery copolymer of butadiene-1,3 and acrylonitrile adhered to vulcanized natural rubber, said product having been prepared by the method of claim 9.

20. A composite product comprising a vulcanized rubbery copolymer of butadiene-1,3 and acrylonitrile adhered to another vulcanized rubbery material, said product having been prepared by the method of claim 10.

DONALD V. SARBACH.